(12) United States Patent
Boltze et al.

(10) Patent No.: US 6,598,938 B2
(45) Date of Patent: Jul. 29, 2003

(54) LOCKING DEVICE FOR A VEHICLE SEAT

(75) Inventors: Wolfgang Boltze, Kaiserslautern (DE); Konrad Diehl, Bexbach (DE); Werner Wittig, Winnweiler (DE)

(73) Assignee: Keiper GmbH & Co., Kaiserslautern (DE)

(*) Notice: Subject to any disclaimer, the term of this patent is extended or adjusted under 35 U.S.C. 154(b) by 0 days.

(21) Appl. No.: 09/906,895

(22) Filed: Jul. 17, 2001

(65) Prior Publication Data

US 2002/0008419 A1 Jan. 24, 2002

(30) Foreign Application Priority Data

Jul. 20, 2000 (DE) .......................................... 100 35 258

(51) Int. Cl.[7] ................................................. B60N 2/02
(52) U.S. Cl. .............. 297/367; 297/378.11; 297/378.12
(58) Field of Search ........................... 297/367, 378.12, 297/378.11

(56) References Cited

U.S. PATENT DOCUMENTS

| 4,233,946 A | * | 11/1980 | Yorioka et al. | ........ 123/568.19 |
|---|---|---|---|---|
| 4,438,974 A | * | 3/1984 | Kresky et al. | ....... 292/DIG. 22 |
| 4,591,207 A | * | 5/1986 | Nithammer et al. | ... 297/354.12 |
| 4,634,182 A | * | 1/1987 | Tanaka | ........................ 297/363 |
| 5,540,117 A | | 7/1996 | Hansel et al. | |

FOREIGN PATENT DOCUMENTS

| DE | 44 39 644 A1 | 6/1995 |
|---|---|---|
| DE | 44 19 411 A1 | 12/1995 |

* cited by examiner

Primary Examiner—Peter M. Cuomo
Assistant Examiner—Erika Garrett
(74) Attorney, Agent, or Firm—Alston & Bird LLP

(57) ABSTRACT

In the case of a locking device for a vehicle seat, in particular for a vehicle seat adjuster, which locking device acts between at least two adjuster parts of the vehicle seat adjuster, which adjuster parts can be adjusted relative to each other, having a first toothed element (11) which is assigned to a first adjuster part, a second toothed element which is assigned to a second adjuster part, at least one clamping element (21) which, in a locked state of the locking device, keeps the two toothed elements (11) in engagement with each other, and at least one intercepting element (30) which, in the event of a crash, supports the first toothed element (11) by means of at least one intercepting surface (31, 32, 33, 34), the intercepting element (30) has at least two intercepting surfaces (31, 32, 33, 34).

31 Claims, 3 Drawing Sheets

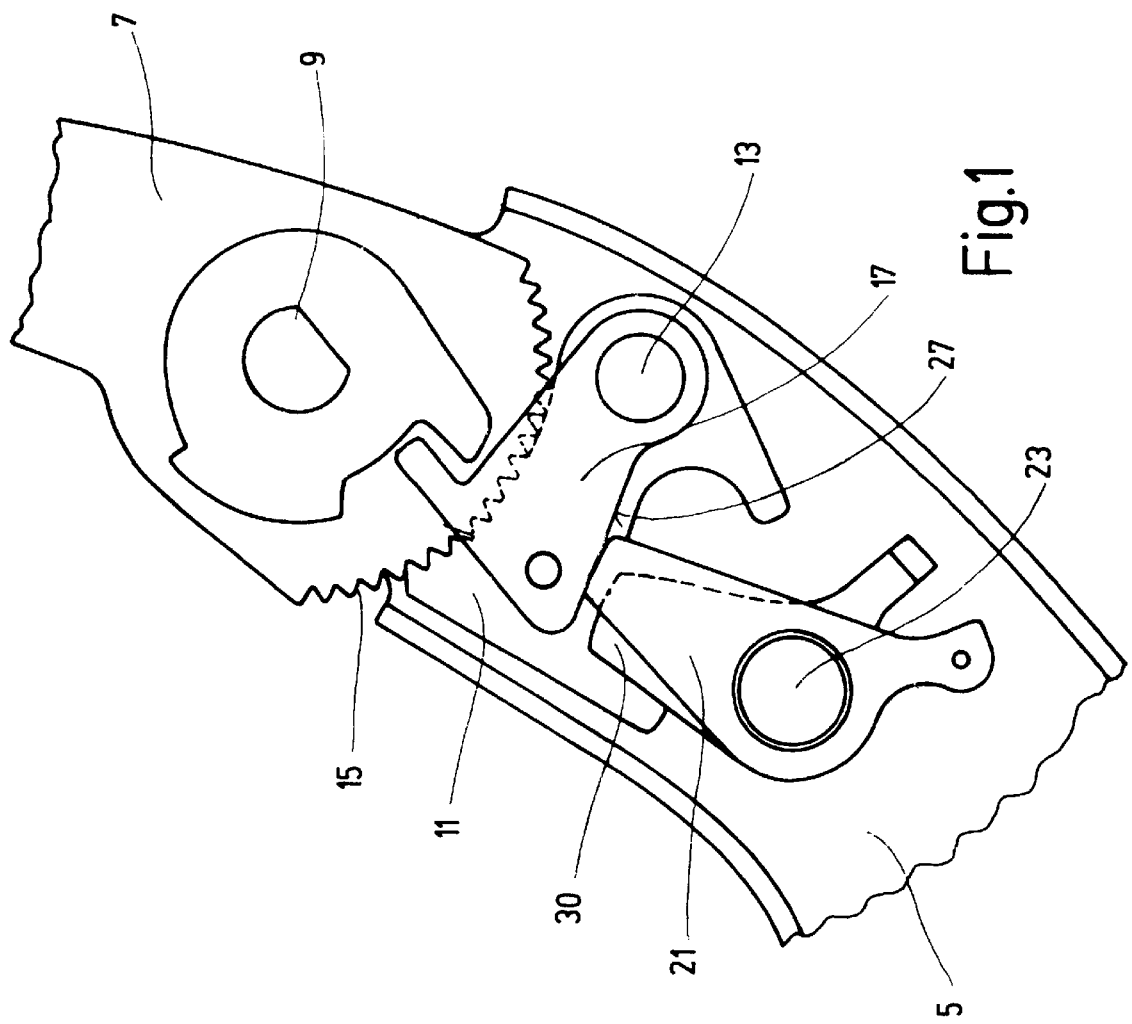
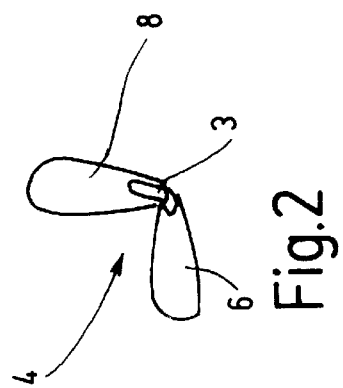
Fig.1
Fig.2

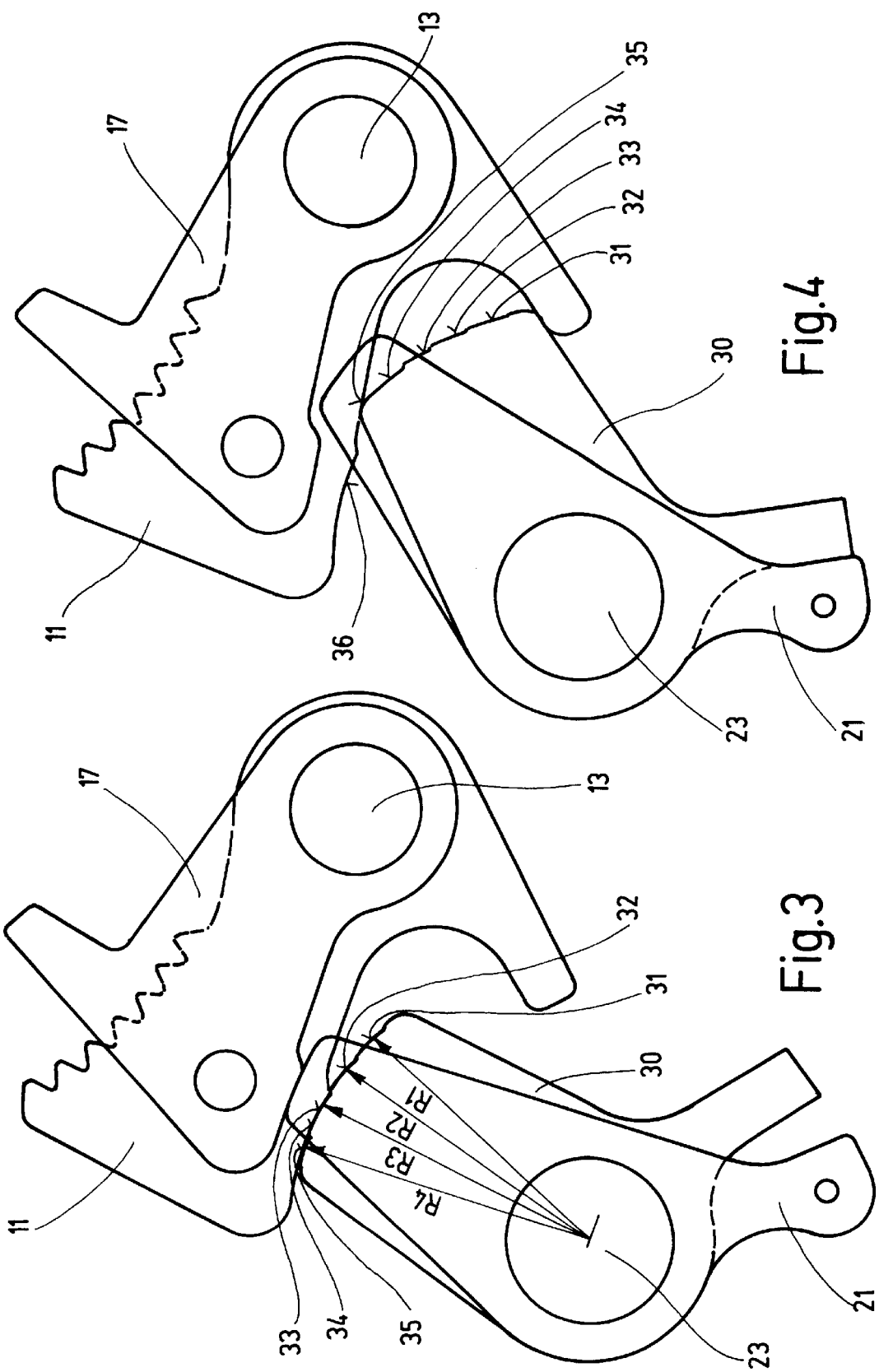

LOCKING DEVICE FOR A VEHICLE SEAT

BACKGROUND OF THE INVENTION

The present invention relates to a locking device for a vehicle seat.

It is known for a locking device to be part of an articulated fitting for a motor vehicle seat. An inclination adjustment provided by such a fitting takes place between a lower part of the fitting, which is fixed to the seat part, and an upper part of the fitting, which is fixed to the backrest. The lower part of the fitting and the upper part of the fitting are locked, except when the backrest is being pivoted, by means of a latch mounted on the lower part of the fitting. The latch is secured by a prestressed, eccentric clamping element. An intercepting element having a concentric intercepting surface serves to support the latch in the event of a crash. Due to manufacturing tolerances, especially in the case of finely stepped inclination adjustment, the distance between the latch and the intercepting element may result in it no longer being possible to absorb the crash load.

SUMMARY OF THE INVENTION

One aspect of the present invention is the provision of an improved locking device of the above-described type. In accordance with this aspect, the locking device is for releasably restricting relative movement between first and second parts of a vehicle seat, or the like, that are mounted for moving relative to one another, and the locking device includes first and second toothed elements mounted for alternately being engaged to one another and disengaged from one another. The first toothed element is for being connected to the first part of the vehicle seat, the second toothed element is for being connected to the second part of the vehicle seat, and the locking device is for allowing the relative movement between the first and second parts of the vehicle seat while the first and second toothed elements are disengaged from one another. The locking device further includes a clamping element that generally keeps the first and second toothed elements engaged to one another while the locking device is in a locked state. The first and second toothed elements restrict relative movement between the first and second parts of the vehicle seat while the first and second toothed elements are kept engaged to one another. The locking device additionally has an intercepting element including at least two intercepting surfaces. In the event of a crash, the intercepting element supports the first toothed element via at least one of the intercepting surfaces to keep the first and second toothed elements engaged to one another.

In accordance with one nonlimiting example of the present invention, the intercepting element is for supporting the first toothed element via a first intercepting surface of the two intercepting surfaces, rather than via a second intercepting surface of the two intercepting surfaces, to keep the first and second toothed elements engaged to one another when the locking device has first tolerances and the crash occurs. Similarly and in accordance with another nonlimiting example of the present invention, the intercepting element is for supporting the first toothed element via the second intercepting surface, rather than via the first intercepting surface, to keep the first and second toothed elements engaged to one another when the locking device has second tolerances, which are different from the first tolerances, and the crash occurs.

On account of the intercepting element having at least two different intercepting surfaces, the functioning of the intercepting element can be ensured and the loss of contact of the toothing minimized even at relatively large tolerances. Two or more intercepting surfaces can be provided. The intercepting surfaces, which are formed preferably concentrically or at least approximately concentrically with the pivot axis of the intercepting element, are preferably arranged adjacent to each other on the intercepting element, i.e. are connected to each other, preferably have small central angles, i.e. an angle of a few degrees, and preferably form a convex contour on the intercepting element. Each of these measures increases the probability of one of the intercepting surfaces taking up the smallest possible distance from the first toothed element, i.e. being aligned parallel to a bearing surface of said toothed element. This preferably applies to just one intercepting surface.

In a preferred embodiment, the two or more intercepting surfaces are at a different distance from the pivot axis of the intercepting element. Radial tolerances can also be compensated for by a slightly eccentric shape of the intercepting element. In this case, steps can be provided between the intercepting surfaces, which steps somewhat reinforce the eccentric shape of the intercepting element.

A vehicle seat according to the invention, in particular a motor vehicle seat, has at least one vehicle seat adjuster or a seat-fixing means on the vehicle floor having a locking device according to the invention. A vehicle seat adjuster of this type may, for example, be a latching fitting having combined inclination adjustment and a free-pivoting function, where the locking device is released in both cases, or may be any desired articulated fitting, for example a tumbling fitting where the locking device is released only for the free-pivoting process. The vehicle seat adjuster may optionally also be a longitudinal adjuster, height adjuster or inclination adjuster. The locking device according to the invention may also be used for the seat-fixing means by which the vehicle seat is fixed to the vehicle floor. The toothed elements which are used can be pivotable latches or latches mounted in a floating manner and having a lateral toothing, displaceable locking bars having a toothing at the front end, gearwheels having an external toothing, hollow wheels having an internal toothing or suitable combinations thereof.

BRIEF DESCRIPTION OF THE DRAWINGS

Figure 5:
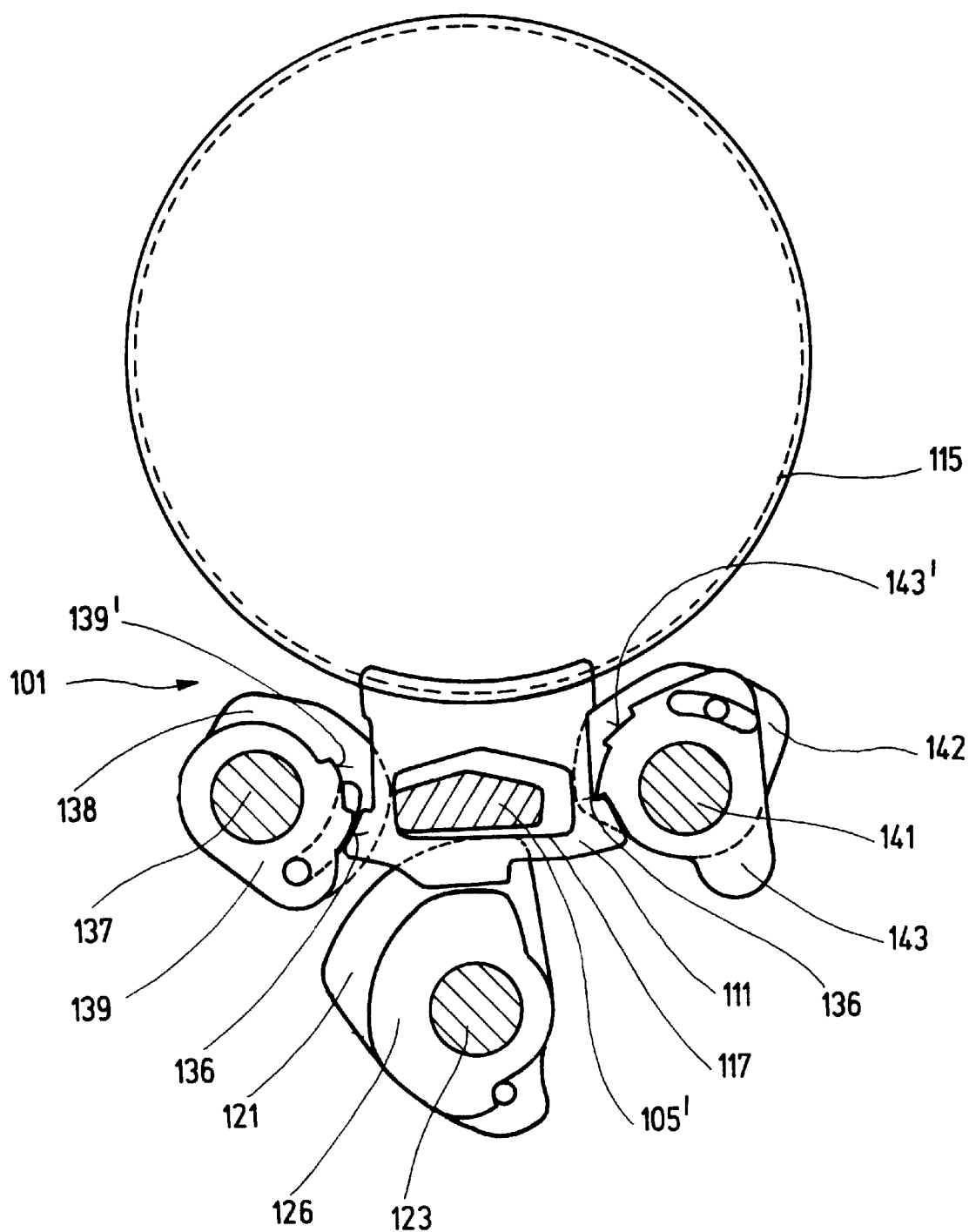

Having thus described the invention in general terms, the invention is explained in greater detail in the following with reference to two exemplary embodiments that are illustrated in the drawings, which are not necessarily drawn to scale, and wherein:

FIG. 1 shows a lateral view, only illustrated in part, of the first exemplary embodiment in a locked state, FIG. 2 shows a schematic side view of a vehicle seat having the first exemplary embodiment, FIG. 3 shows a detail from an illustration corresponding to FIG. 1 of the first exemplary embodiment, in a position after a crash, FIG. 4 shows an illustration corresponding to FIG. 3 of the first exemplary embodiment in an open position, and FIG. 5 shows a section through the second exemplary embodiment.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The first exemplary embodiment relates to a locking device for an articulated fitting 3 of a vehicle seat 4 which is used in a motor vehicle. The arrangement of the vehicle seat 4 in the motor vehicle and the normal travelling direction thereof define the following directional details. The articulated fitting 3 is designed as a latching fitting, but may also be designed as a tumbling fitting. The articulated fitting 3 comprises a lower part 5 of the fitting, which is connected to a seat part 6 of the vehicle seat 4, and an upper part 7 of the fitting, which is connected to a backrest 8 of the vehicle seat 4. During a free-pivoting process, the two fitting parts 5 and 7 can be pivoted relative to each other about a backrest rotational axis 9 and, in the exemplary embodiment, also during an inclination adjustment of the backrest 8, and are otherwise locked to each other by the locking device.

For the locking procedure, on the one side a pivotable latch 11 is coupled as a first toothed element to the lower part 5 of the fitting by means of a first bolt 13, and, on the other side, the upper part 7 of the fitting has, concentrically with the backrest rotational axis 9, a toothed ring 15 which is fixed to the upper part of the fitting as a second toothed element. In the locked state of the locking device, the latch 11 engages with a toothing, which is provided at the free end of the latch 11, into the toothing of the toothed ring 15 without self-locking. In order to be able to adjust the articulated fitting 3 which is used as a backrest inclination adjuster, or in order to be able to freely pivot the backrest 8 in order to gain access to the rear seat bench, the latch 11 can be pivoted away from the toothed ring 15. The latch 11 is assigned a control element 17 which is rotationally fixed or connected integrally to it.

In order to keep the latch 11 in engagement with the toothed ring 15, a clamping element 21 is provided which is coupled to the lower part 5 of the fitting by means of a second bolt 23. The pivotable clamping element 21 is spring-loaded in the direction of the latch 11 where a clamping surface 27 of the latch 11 is arranged in the pivoting region of the free end of the clamping element 21, which clamping surface is formed on that side of the control element 17 which faces away from the toothed ring 15, but could alternatively be situated on the latch 11. In the locked state, the clamping element 21, which is provided with an eccentric contour on the free end, bears against the clamping surface 27 with tension and outside the self-locking range, so that the latch 11 is held in the toothed ring 15.

An intercepting element 30, which is mounted pivotably about the second bolt 23, is formed separately from the clamping element 21, but may be carried along by the latter. The intercepting element 30 has, next to one another on its free end, a first intercepting surface 31 whose distance from the second bolt 23 is R1, a second intercepting surface 32 whose distance from the second bolt 23 is R2, a third intercepting surface 33 whose distance from the second bolt 23 is R3, a fourth intercepting surface 34 whose distance from the second bolt 23 is R4, and a fifth surface 35. The fifth surface 35 restricts the stroke of the latch in the opened state. Small steps are formed between the associated intercepting surfaces 31, 32, 33 and 34 by the different distances R1, R2, R3 and R4. The four intercepting surfaces 31, 32, 33 and 34, which are arranged tangentially with regard to the second bolt 23, are curved concentrically with each other about the second bolt 23. The four intercepting surfaces 31, 32, 33 and 34 are each at an angle of approximately 6° to 9°, preferably 8°, to each other. The intercepting element 30, which is spring-loaded with respect to the clamping element 21, is coupled to the clamping element 21 by means of carryalong stops or slot and pin guides, so that when the locking device is unlocked the intercepting element 30 can carry along the clamping element 21.

In the normal, locked state one of the four intercepting surfaces 31, 32, 33 and 34 lies at a small distance opposite a bearing surface 36 of the latch 11. Tolerances due to the manufacturing procedure ultimately decide which of the four intercepting surfaces 31, 32, 33 and 34 lies in the direct vicinity of the bearing surface 36 and is approximately parallel to the latter. In the event of a crash, the backrest 8 exerts a torque on the upper part 7 of the fitting, which exerts, via the toothed ring 15, an opening torque on the latch 11 which, in turn, presses back the clamping element 21 counter to its spring loading. The bearing surface 36 then comes to bear against one of the intercepting surfaces 31, 32, 33 or 34. On account of the at least approximate concentricity of the intercepting surfaces 31, 32, 33 and 34, the latch 11 is unable to exert an opening torque on the intercepting element 30, so that the latch 11 and the intercepting element 30 remain in this position, i.e. the intercepting element 30 supports the latch 11. At the same time, the latch 11 is still in engagement with the toothed ring 15, and so the locking device remains locked.

In the second exemplary embodiment, a locking device 101 according to the invention for an articulated fitting designed as a latching fitting is provided, in order to be able to infinitely lock said articulated fitting. Components which are identical to components of the first exemplary embodiment or have the same function as the latter bear reference numbers which are correspondingly higher by 100. Otherwise, the second exemplary embodiment and the first exemplary embodiment correspond. Mounted in a floating manner on the lower part of the fitting, which is situated above the plane of the drawing in FIG. 5, is, as a first toothed element, a toothed locking bar 111 which interacts with a toothed ring 115 which is provided on the upper part of the fitting as the second toothed element.

A cam 117, which projects into the plane of the drawing in FIG. 5, is formed on the locking bar 111 by means of material being forced out. A first clamping element 121, which is coupled pivotably to the lower part of the fitting by means of a first bolt 123, bears in a spring-loaded manner with an eccentric contour against the cam 117 on the side which faces away from the toothing of the locking bar 111, in order to keep the locking bar 111 in engagement with the toothed ring 115. A first intercepting element 126 is likewise mounted pivotably on the first bolt 123, is coupled by means of a carry-along pin and a stop to the first clamping element 121 and is spring-loaded with respect to the latter. In the normal, locked state of the locking device 101 the free end of the first intercepting element 126, which may also be stepped, is arranged at a small distance from that end of the locking bar 111 which faces away from the toothing of the locking bar 111.

The locking bar 111 acts on the circular toothed ring 115 in the radial direction. In order to be able to engage at inclination angles which deviate by less than one tooth width from the tooth pitch of the toothed ring 115, the locking bar 111 is mounted in a floating manner in that the holder, which is produced by the forcing out of the cam 117, surrounds an island 105 which is forced out of the lower part of the fitting and has a smaller cross section. The locking bar 111 can therefore be guided and supported laterally in the region of its lateral flanks 136, i.e. in the tangential direction with regard to the toothed ring 115. For this purpose, a second clamping element 138 and a second intercepting element 139 are mounted on a second bolt 137 on the one flank 136, while a third clamping 142 and a third intercepting element 143 are mounted on a third bolt 141 on the other flank 136.

The second and third clamping elements 138 and 142, respectively, correspond in their function and manner of action to the first clamping element 121, i.e. are likewise spring-loaded and by means of an eccentric contour interact with the cam 117. The second and third intercepting elements 139 and 143, respectively, are each coupled correspondingly to the associated clamping element 138 and 142 by means of slot and pin guides. At the free end, the second and third intercepting elements 139 and 143 have a plurality of intercepting surfaces 139' and 143', respectively, which are formed concentrically with the bolt 141 and have stepped radii. Depending on the position of the locking bar 111 one of the intercepting surfaces 139' or 143' is situated in each case in the direct vicinity of the associated flank 136 of the locking bar 111, so that, corresponding to the situation in the first exemplary embodiment, in the event of a crash they come to bear against each other without an opening torque being transmitted.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for

What is claimed is:

1. A locking device for releasably restricting relative movement between first and second reference parts that are mounted for there being relative movement therebetween, with at least the first reference part being part of a vehicle seat, the locking device comprising:

first and second elements mounted for alternately being engaged to one another and disengaged from one another, wherein the first element is pivotally mounted on a first fitting part that is for being connected to the first reference part, the second element is mounted on a second fitting part that is for being connected to the second reference part, and the locking device is for allowing the relative movement between the first and second fitting parts while the first and second elements are disengaged from one another;

a clamping element pivotally mounted on the first fitting part in proximity to the first element for generally keeping the first and second elements engaged to one another while the locking device is in a locked state, wherein the first and second elements restrict relative movement between the first and second fitting parts while the first and second elements are kept engaged to one another; and an intercepting element including at least two intercepting surfaces, wherein the intercepting element is pivotally mounted on the first fitting part in proximity to the clamping element so that in the event of a crash, the intercepting element supports the first element via at least one of the intercepting surfaces to keep the first and second elements engaged to one another.

2. A locking device according to claim 1, wherein the intercepting surfaces are arranged adjacent to each other on the intercepting element.

3. A locking device according to claim 1, wherein the intercepting surfaces form a convex contour on the intercepting element.

4. A locking device according to claim 1, wherein the intercepting element is mounted for pivoting about a pivot axis between different positions, the intercepting element is pivoted between the different positions when the locking device transitions between the locked state and an open state, and the intercepting surfaces are arranged at least approximately concentrically with the pivot axis of the intercepting element.

5. A locking device according to claim 1, wherein the intercepting element is mounted for pivoting about a pivot axis between different positions, the intercepting element is pivoted between the different positions when the locking device transitions between the locked state and an open state, and the intercepting surfaces are at a different radial distance from the pivot axis of the intercepting element.

6. A locking device according to claim 1, wherein a step is provided between the intercepting surfaces.

7. A locking device according to claim 1, wherein the first reference part of the vehicle seat is a backrest part of the vehicle seat, the locking device is part of a latching fitting, and the latching fitting is for adjusting an inclination of the backrest part and freely pivoting the backrest part.

8. A locking device according to claim 1, wherein the clamping element and the intercepting element are pivotally mounted to the first fitting part via the same bolt.

9. A locking device according to claim 1, wherein the first element is a latch and the second element is a toothed ring, and wherein the latch engages the toothed ring to restrict relative movement between the first and second fitting parts.

10. A locking device according to claim 1, wherein the intercepting element has three or more intercepting surfaces.

11. A locking device according to claim 1, wherein:
    the second reference part is a part of the same vehicle seat as the first reference part; and
    the first and second elements respectively are first and second toothed elements mounted for alternately being engaged to one another and disengaged from one another.

12. A locking device according to claim 11, wherein in the event of the crash one of the intercepting surfaces of the intercepting element engages a bearing surface of the first toothed element.

13. A locking device according to claim 11, in combination with the vehicle seat, wherein the vehicle seat has at least one adjuster mounted between the first and second reference parts of the vehicle seat for adjusting the relative position defined between first and second reference parts of the vehicle seat, and the adjuster includes the locking device, the first fitting part is connected to the first reference part of the vehicle seat, and the second fitting part is connected to the second reference part of the vehicle seat.

14. A locking device according to claim 11, wherein in the event of the crash at least one of the intercepting surfaces engages a bearing surface of the first toothed element to keep the first and second toothed elements engaged to one another, and wherein the intercepting element is mounted for pivoting about a pivot axis between different positions, the intercepting element is pivoted between the different positions when the locking device transitions between the locked state and an open state, and the intercepting surfaces are arranged at least approximately concentrically with the pivot axis of the intercepting element and at different radial distances from the pivot axis of the intercepting element.

15. A locking device according to claim 14, wherein a step is provided between the intercepting surfaces.

16. A locking device according to claim 14, wherein the intercepting surfaces are arranged adjacent to each other on the intercepting element.

17. A locking device according to claim 14, wherein the intercepting surfaces form a convex contour on the intercepting element.

18. A locking device according to claim 14, in combination with a vehicle seat, wherein the first fitting part is connected to the first reference part of the vehicle seat and the second fitting part is connected to the second reference part of the vehicle seat.

19. A locking device according to claim 11, wherein:
the intercepting element is for supporting the first toothed element via a first intercepting surface of the two intercepting surfaces, rather than via a second intercepting surface of the two intercepting surfaces, to keep the first toothed element in engagement with the second toothed element when the locking device has first tolerances and the crash occurs, and
the intercepting element is for supporting the first toothed element via the second intercepting surface, rather than via the first intercepting surface, to keep the first toothed element in engagement with the second toothed element when the locking device has second tolerances, which are different from the first tolerances, and the crash occurs,
whereby functioning of the intercepting element can be ensured and loss of engagement between the first and second toothed elements can be minimized even at relatively large tolerances.

20. A locking device according to claim 19, wherein in the event of the crash at least one of the intercepting surfaces engages a bearing surface of the first toothed element to keep the first and second toothed elements in engagement with one another, and wherein the intercepting element is mounted for pivoting about a pivot axis between different positions, the intercepting element is pivoted between the different positions when the locking device transitions between the locked state and an open state, and the two intercepting surfaces are arranged at least approximately concentrically with the pivot axis of the intercepting element and at different radial distances from the pivot axis of the intercepting element.

21. A locking device according to claim 20, wherein a step is provided between the two intercepting surfaces.

22. A locking device according to claim 20, wherein the two intercepting surfaces are arranged adjacent to each other on the intercepting element.

23. A locking device according to claim 20, wherein the two intercepting surfaces are spaced from the first toothed element in the locked state.

24. A locking device according to claim 11, wherein the intercepting element is mounted for pivoting about a pivot axis between different positions, the intercepting element is pivoted between the different positions when the locking device transitions between the locked state and an open state, and the two intercepting surfaces are arranged at least approximately concentrically with the pivot axis of the intercepting element.

25. A vehicle seat, comprising:
first and second fitting parts mounted for there being relative movement therebetween; and
an adjusting means for causing relative movement between the first and second fitting parts, wherein the adjusting means includes a locking device having:
first and second toothed elements mounted for alternately being engaged to one another and disengaged from one another, wherein the first toothed element is pivotally mounted on the first fitting part, the second toothed element is mounted on the second fitting part, the locking device is for allowing the relative movement between the first and second fitting parts while the first and second toothed elements are disengaged from one another, and the locking device is for restricting the relative movement between the first and second fitting parts while the first and second toothed elements are engaged to one another;
a clamping element pivotally mounted on the first fitting part for generally keeping the first and second toothed elements engaged to one another while the locking device is in a locked state, wherein the first and second toothed elements restrict operation of the adjusting means while the first and second toothed elements are kept engaged to one another; and
an intercepting element including at least two intercepting surfaces, wherein the intercepting element is pivotally mounted on the first fining part so that in the event of a crash, the intercepting element supports the first toothed element via at least one of the intercepting surfaces to keep the first and second toothed elements engaged to one another.

26. A vehicle seat according to claim 25, wherein in the event of the crash at least one of the intercepting surfaces engages a bearing surface of the first toothed element to keep the first and second toothed elements engaged to one another, and wherein the intercepting element is mounted for pivoting about a pivot axis between different positions, the intercepting element is pivoted between the different positions when the locking device transitions between the locked state and an open state, and the intercepting surfaces are arranged at least approximately concentrically with the pivot axis of the intercepting element and at different radial distances from the pivot axis of the intercepting element.

27. A locking device for releasably restricting movement of at least part of a vehicle seat, the locking device comprising:
first and second toothed elements, wherein the first toothed element is mounted for moving into and out of engagement with the second toothed element, and the locking device is for restricting movement of at least part of the vehicle seat while the first toothed element is in engagement with the second toothed element;
a plurality of clamping elements that are pivotally mounted and biased for generally keeping the first toothed element in engagement with the second toothed element, with the plurality of clamping elements including:
a first clamping element positioned for urging the first toothed element in a first direction, and
a second clamping element positioned for urging the first toothed element in a second direction which is different from the first direction; and a plurality of intercepting elements respectively pivotally mounted in close proximity to the clamping elements for supporting the first toothed element to keep the first toothed element in engagement with the second toothed element in the event of a crash, wherein for at least one of the intercepting elements, the intercepting element includes at least two intercepting surfaces, and in the event of a crash, the intercepting element supports the first toothed element via at least one of the intercepting surfaces further to keeping the first toothed element in engagement with the second toothed element.

28. A locking device according to claim 27, further comprising:

a first bolt adjacent to a first side of the first toothed element, wherein the first clamping element and a first intercepting element of the plurality of intercepting elements are pivotally mounted to the first bolt; and a second bolt adjacent to a second side of the first toothed element, wherein the second clamping element and a second intercepting element of the plurality of intercepting elements are pivotally mounted to the first bolt.

29. A locking device according to claim 27, wherein one of the first or second toothed elements is longitudinally movable to engage the other of the first and second toothed elements.

30. A locking device according to claim 27, wherein:

the plurality of clamping elements further includes a third clamping element positioned for urging the first toothed element in a third direction that is different from the first and second directions; and the plurality of intercepting elements includes three intercepting elements.

31. A locking device according to claim 27, wherein the first toothed element is a locking bar.

* * * * *

UNITED STATES PATENT AND TRADEMARK OFFICE
CERTIFICATE OF CORRECTION

PATENT NO. : 6,598,938 B2
DATED : July 29, 2003
INVENTOR(S) : Boltze et al.

It is certified that error appears in the above-identified patent and that said Letters Patent is hereby corrected as shown below:

Title page,
Item [56], References Cited, U.S. PATENT DOCUMENTS,
"4,233,946A   11/1980   Yorioka et al."
should read -- 4,223,946A   9/1980   Kluting --.

Column 8,
Line 32, "fining" should read -- fitting --.

Signed and Sealed this

Twenty-fifth Day of November, 2003

JAMES E. ROGAN
*Director of the United States Patent and Trademark Office*